July 5, 1927.

W. H. WINEMAN 1,635,146

VALVE MECHANISM

Filed Jan. 29, 1924

Inventor:
Wade H. Wineman.
by
atty.

Patented July 5, 1927.

1,635,146

UNITED STATES PATENT OFFICE.

WADE H. WINEMAN, OF MICHIGAN CITY, INDIANA, ASSIGNOR TO SULLIVAN MACHINERY COMPANY, A CORPORATION OF MASSACHUSETTS.

VALVE MECHANISM.

Application filed January 29, 1924. Serial No. 689,377.

My invention relates to valve mechanisms and particularly to admission valve mechanisms for fluid pressure motors.

An object of my invention is to provide an improved valve mechanism. Another object of my invention is to provide an improved valve mechanism in which friction and wear will be reduced to a minimum degree. A still further object of my invention is to provide an improved valve mechanism in which, while the valve may close tightly and so prevent leakage, means may be provided for preventing needless wear of the operating parts. Other objects and advantages of my invention will, however, hereinafter more fully appear.

In the accompanying drawings I have shown for purposes of illustration one form which my invention may assume in practice In these drawings,—

Figure 1:
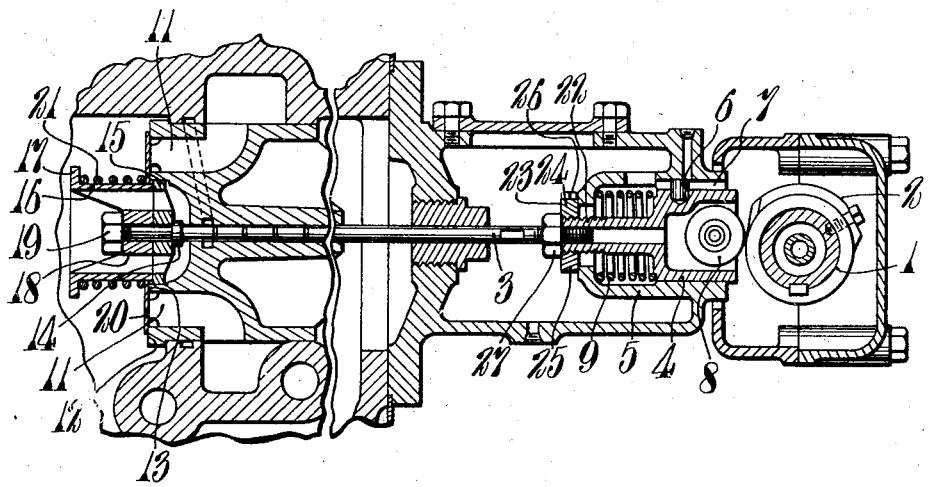
Fig. 1 is a central longitudinal section through a valve mechanism constructed in accordance with my invention.
Figure 2:
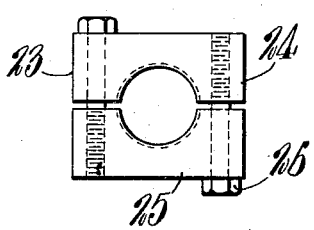
Fig. 2 is an elevation of a detail.

My invention constitutes an improvement upon the invention of one Alexander D. Ferguson shown and described in his application for Letters Patent, Ser. No. 568,260, filed June 14, 1922.

In his application, the said Ferguson disclosed a cam operated inlet valve mechanism for a steam cylinder, which mechanism comprised a cam shaft, herein illustrated at 1, and carrying a cam, herein designated 2, which was rotatable to effect longitudinal movements of a valve rod, herein numbered 3. At its end adjacent the cam shaft the rod 3 carried a member, herein marked 4, which was reciprocable in a cage or guide member, 5 herein, and prevented from rotation by a pin in said guide member engaging in a slot in the member 4, said pin and slot being herein illustrated at 6 and 7 respectively. The member 4 carried suitably journaled therein a cam engaging roller, 8 herein, and a spring, shown at 9, acted upon the member 4 to maintain the roller constantly in engagement with the surface of the cam member 2. At its opposite end the valve stem carried a valve mechanism which cooperated with admission ports, herein designated by 11, leading to the cylinder bore. The inlet ports 11 were surrounded by valve seating surfaces which are herein shown at 12, 13. At its end, the valve stem carried adjacent an abutment, numbered herein 14, thereon a spider member, which is illustrated at 15, upon which a cylindrical sleeve, herein numbered 16, having an annular flange, as indicated at 17, at its outer end was supported, the cylindrical member carrying coaxial therewith a portion, herein designated by 18, traversed by the rod 3 and engaged by a nut, herein numbered 19, which clamped the parts 15 and 16 together. Surrounding the member 16 was a light flexible valve member, annular in outline, and of resilient material, herein designated 20, between which valve mechanism and the collar 17 was provided a spring, which is shown herein at 21. When the valve was closed, the spring 21 forced the valve to its seat and the valve did not quite engage the member 15. On opening of the valve, it was engaged by the portion of the member 15 lying outside the sleeve member 16 and the valve was thereby forced off of its seat. In other words the valve was resiliently seated and was engaged by an abutment portion carried by the valve stem when it was desired to open it for admission. The construction was such that the valve stem and its related parts were constantly held so that the roller 8 was at all times in engagement with the periphery of the cam 2 and accordingly there was an unnecessary amount of wear both on the cam and roller and on the bearings of the latter.

For the purpose of preventing this wear, I have threaded the extremity of a stem-like portion of the member 4, as indicated at 22, and have clamped thereto a split nut 23 made up of two parts 24, 25, held together by machine screws 26 and adapted to be clamped tightly after adjustment to the portion 22 in a position to engage the end of the member 4 and hold the parts with the roller 8 in such position that it will not be engaged by the lowest portion of the cam 2. To insure the parts remaining in adjusted position I have added a lock nut 27. By means of this construction it will be at once apparent that I am enabled to move the roller 8 to such a position relative to the cam shaft 1 that it is engaged by the periphery of the cam substantially only during opening and closing movements of the valve and while the latter is full open, the distance between the roller and the periphery of the cam when the valve is closed being, however, normally very small, perhaps a few thousandths of an inch. As a result, with the construction shown, approximately one-half of the wear upon the bearings and roller 8 is avoided, and as a result compensation for wear in the form of adjustments or replacements is substantially reduced. It will be noted that the provision of this stop nut 23 cooperates in a special manner with the construction of the inlet valve, for, notwithstanding the fact that the stem is moved bodily toward the left for a short distance by this adjustment, the spring 21 none the less serves to maintain the valve 20 upon its seat.

While I have in this application specifically described one form which my invention may assume, it will be understood that this form has been shown for purposes of illustration and that the invention may be modified and embodied in various other forms without departing from its spirit or the scope of the appended claims.

What I claim as new and desire to secure by Letters Patent is:

1. In a valve mechanism, a valve stem, a valve resiliently mounted thereon, a cam engaging roller carried by said valve stem, a cam adapted to actuate said valve stem, means for moving said valve stem towards said cam, and means for positively limiting the movement of said valve stem toward said cam to prevent engagement of said roller by said cam for a portion of each revolution thereof.

2. In a valve mechanism, a valve, a valve actuating member having a portion slidably projecting through said valve, cam actuating means for said member towards which the same is normally biased, and means for positively limiting the movement of said member towards said cam actuating means to prevent constant contact between them.

3. In a valve mechanism, a valve actuating member, cam actuating means therefor, said valve actuating member being normally biased towards said cam actuating means, a valve operatively associated with said valve actuating member and free to be opened without actuation by said valve actuating member, a resilient connection between said valve and member, and means for positively limiting movement of said member towards said cam actuating means.

4. In a valve mechanism, a valve actuating member, cam actuating means therefor, said valve actuating member being normally biased towards said cam actuating means, a valve operatively, associated with said valve actuating member and free to be opened without actuation by said valve actuating member, a resilient connection between said valve and member, and means for positively limiting movement of said member towards said cam actuating means including an adjustable split nut.

5. In a valve mechanism, a valve, a valve stem carrying a cam follower, a fixed abutment through which said stem projects, and means adjustably carried by said stem engageable with said abutment to adjustably limit positive movement therebetween in one direction.

In testimony whereof I affix my signature.

WADE H. WINEMAN.